DIRECT LIGHTING LUMINAIRES
Original Filed Feb. 1, 1952 4 Sheets-Sheet 1
Fig. 1a.
Fig. 1.
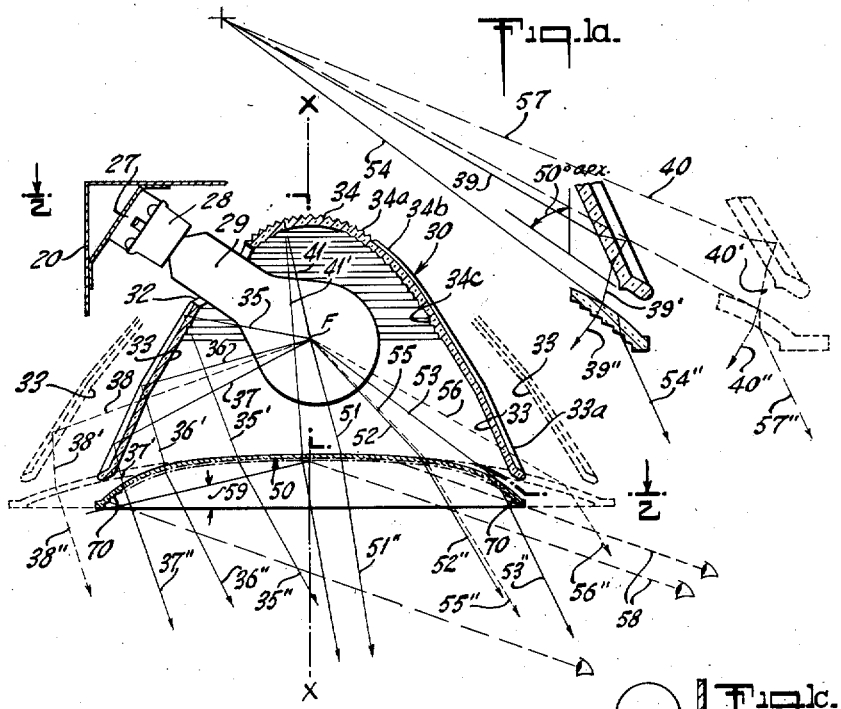
Fig. 1b.
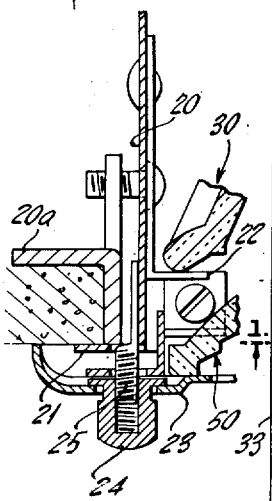
Fig. 2.
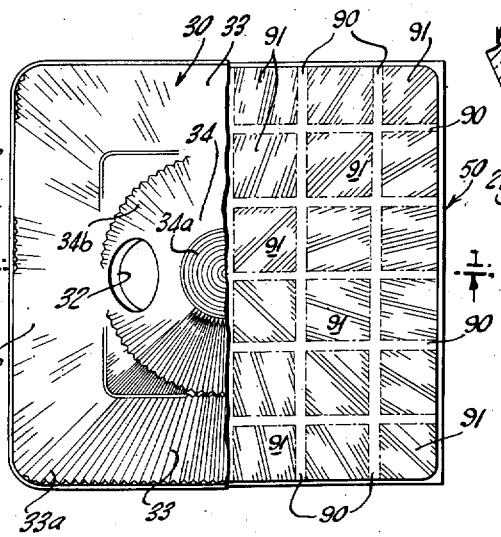
Fig. 1c.
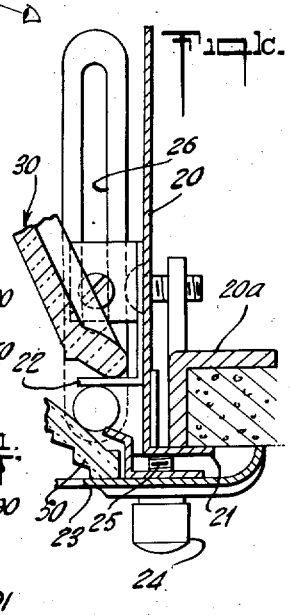
INVENTOR
KURT FRANCK
BY John W. Cole
ATTORNEY DIRECT LIGHTING LUMINAIRES
Original Filed Feb. 1, 1952 4 Sheets-Sheet 2
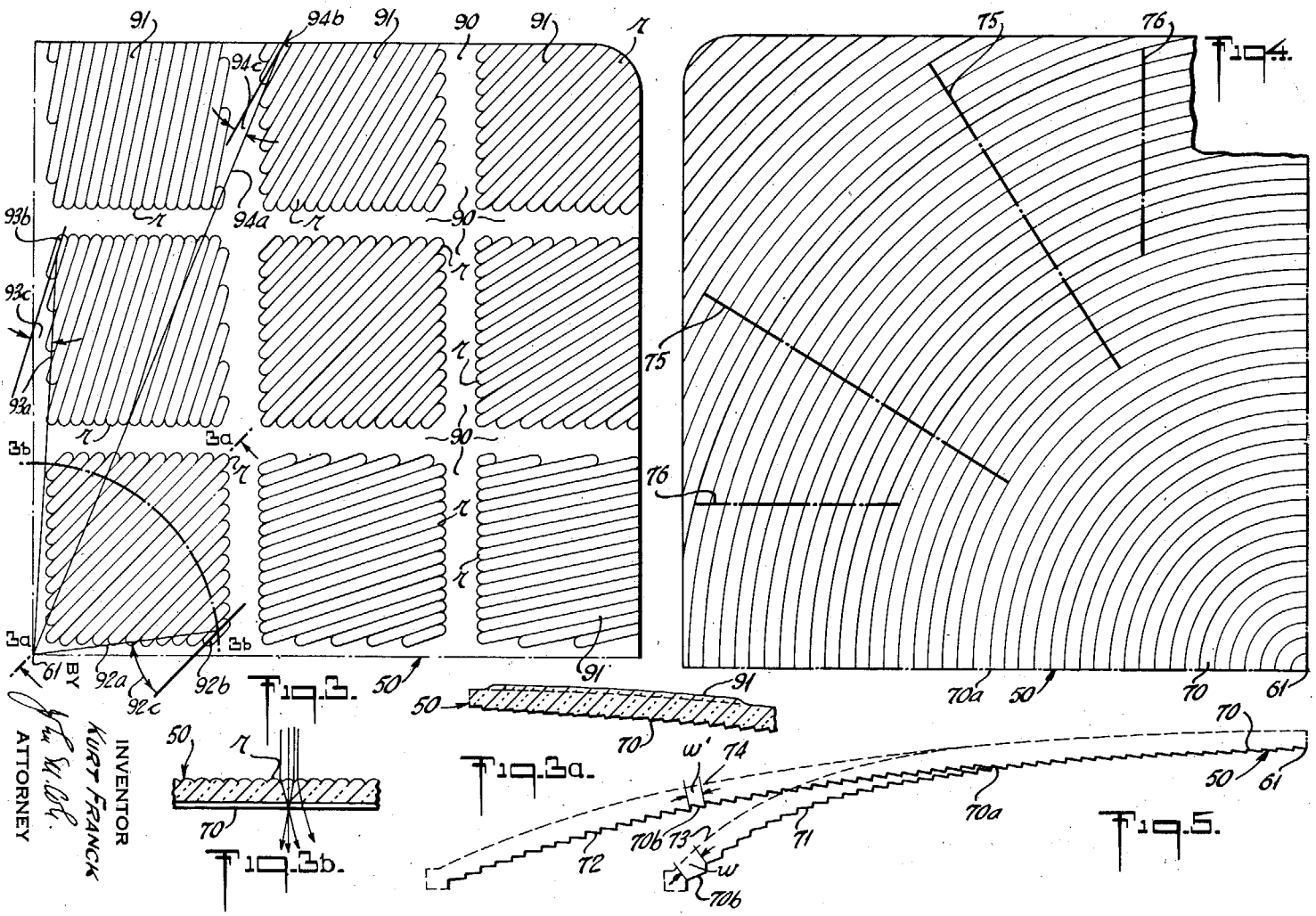
INVENTOR
KURT FRANCK
BY
ATTORNEY

DIRECT LIGHTING LUMINAIRES

Original Filed Feb. 1, 1952 4 Sheets-Sheet 3

INVENTOR
KURT FRANCK
BY John W. Orth
ATTORNEY

DIRECT LIGHTING LUMINAIRES

Original Filed Feb. 1, 1952 4 Sheets-Sheet 4

INVENTOR
KURT FRANCK
BY John M. Cole
ATTORNEY

United States Patent Office

Re. 24,372
Reissued Oct. 8, 1957

24,372

DIRECT LIGHTING LUMINAIRES

Kurt Franck, Newark, Ohio, assignor to Holophane Company, Inc., New York, N. Y., a corporation of Delaware Original No. 2,756,326, dated July 24, 1956, Serial No. 269,517, February 1, 1952. Application for reissue December 28, 1956, Serial No. 631,387

28 Claims. (Cl. 240—93)

Matter enclosed in heavy brackets [ ] appears in the original patent but forms no part of this reissue specification; matter printed in italics indicates the additions made by reissue.

The present invention relates to direct lighting luminaires, and is more particularly directed toward direct lighting luminaires adapted for relatively low mounting heights above the working areas.

In such fixtures, the screening of the light source itself and of sources of annoying brightness in the glare zones is extremely important and it is necessary to concentrate the output into angles from nadir which suitably light horizontal and vertical surfaces at usual ratios of spacing to mounting height.

The present invention contemplates luminaires for these purposes employing with the light source a specular reflector closed off by a prismatic light transmitting plate adapted to cooperate to very efficiently transmit the light from the source and place it on the working area and to have very desirable brightness and appearance characteristics.

Other and further objects will appear as the description proceeds.

The accompanying drawings show, for purposes of illustrating the present invention, one embodiment in which the invention may take form, together with modifications of certain parts, it being understood that the drawings are illustrative of the invention rather than limiting the same.

In the accompanying drawings:

Figure 1 is a transverse vertical section taken at a relatively small scale through a direct lighting luminaire, showing in full lines the profiles of the reflector and refracting plate and the paths of direct and reflected rays from a source at a point in said plane, and showing in dotted lines the diagonal profiles of a square luminaire and light control in diagonal planes from such a source, the full line section being on the line 1—1 of the square fixture of Figure 2, the dotted line section being on the diagonal of Figure 2.

Figure 1a is a fragmentary view similar to Figure 1 but at an enlarged scale to show light control at the margins of the reflector and plate;

Figures 1b and 1c are fragmentary sectional views at a larger scale, illustrating the lamp box and trim which support the reflector and refracting plate;

Figure 2 is a top plan view of a square fixture taken on the broken line 2—2 of Figure 1;

Figure 3 is a top plan view of one-quarter of the square refracting plate of Figures 1 and 2;

Figure 6:
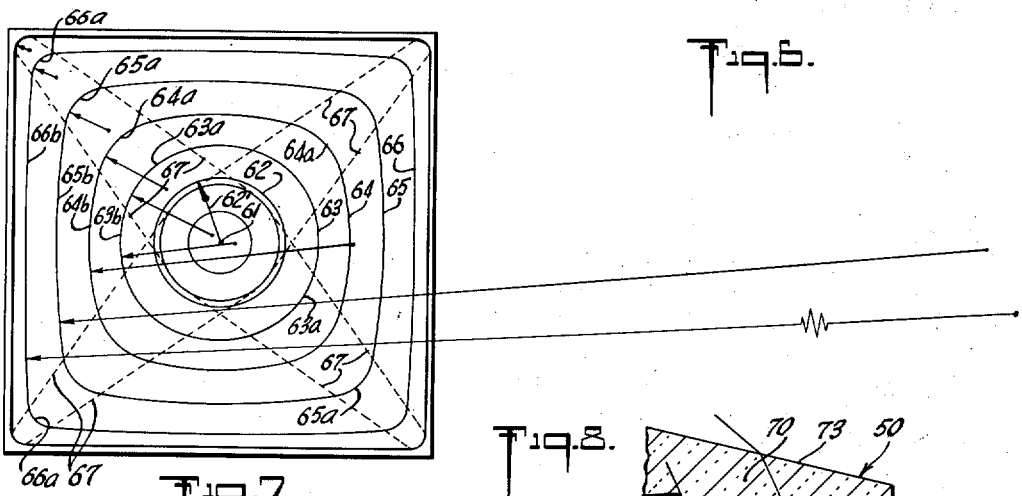
Figure 7:
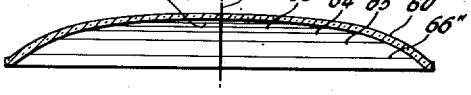
Figure 8:
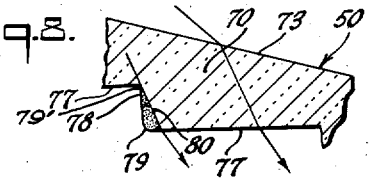
Figure 8A:
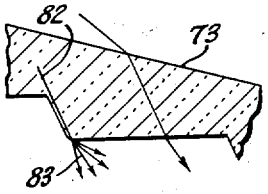
Figure 10:
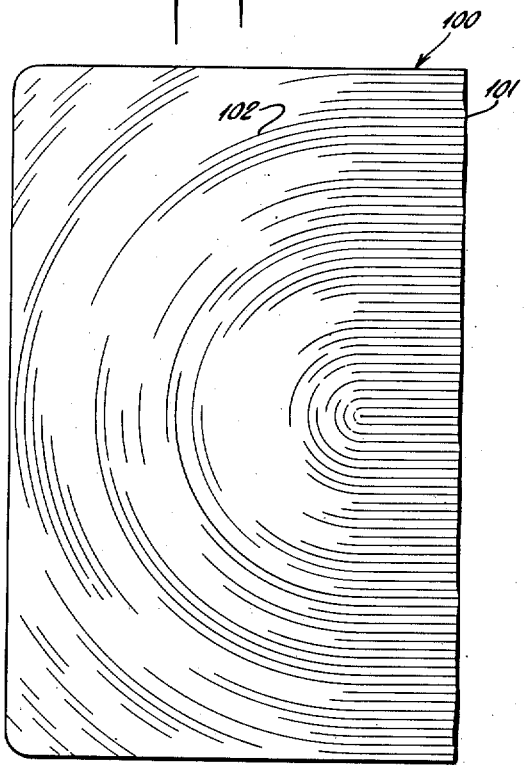
Figure 11:
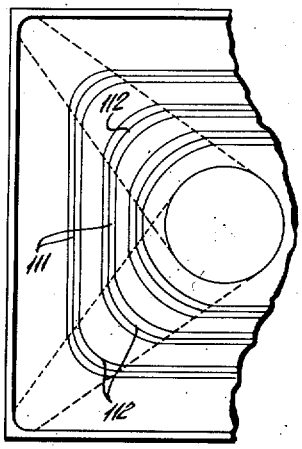
Figure 9:
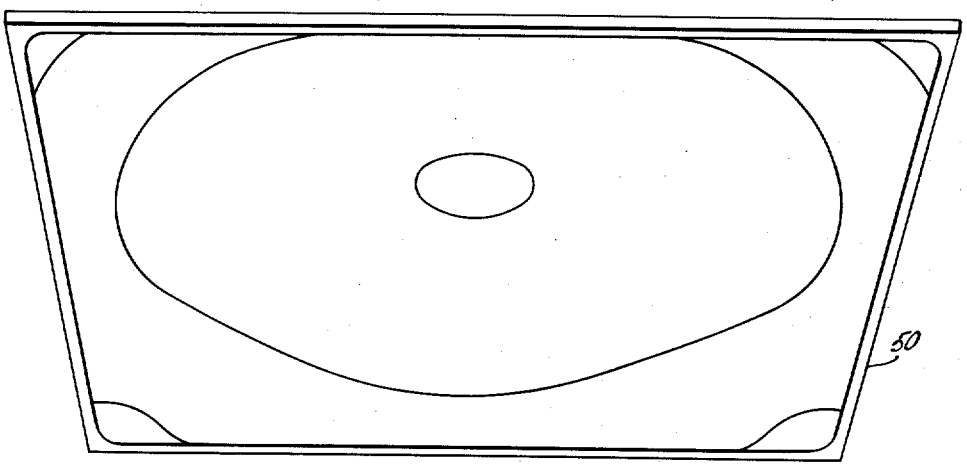
Figure 9A:
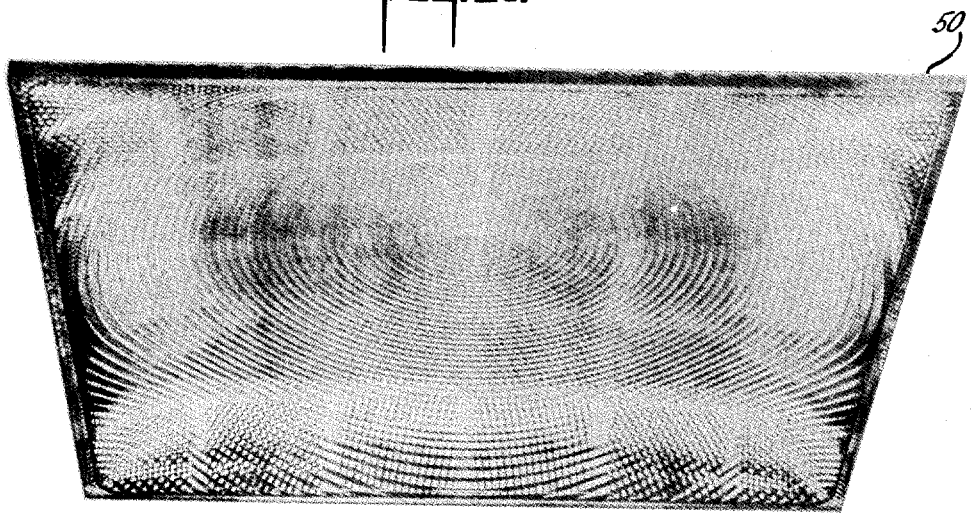

Figures 3a and 3b are fragmentary sections taken at right angles to one another and on the radial line 3a and the arc 3b, respectively, of Figure 3;

Figure 4 is an inverted plan view of one-quarter of the square plate of Figures 1, 2 and 3, illustrating the concentric prisms on the same and the division of the same into discrete areas;

Figure 5 is a diagrammatic view showing for comparison purposes the profiles of concentric prisms on the square plate taken in the plane 1—1 of Figure 2 and on the diagonal;

Figures 6 and 7 are diagrammatic views illustrating in plan and section the geometric layout to obtain the three dimensional contours of the molding equipment and the resulting refractor;

Figures 8 and 8a are fragmentary sectional views taken respectively through the improved and prior art refracting prisms to show comparison of light control;

Figure 9 is a perspective view of the square refracting plate as viewed from underneath and in an oblique direction and showing the curvature of typical prisms;

Figure 9a is a photograph of the plate similarly viewed;

Figure 10 is an inverted plan view of a refracting plate suitable for use at the end of an elongated direct lighting fixture; and Figure 11 is a fragmentary inverted plan view of a modified form of lens plate.

The luminaire of Figures 1 to 2, inclusive, is shown as a square luminaire adapted to employ a square lamp box and to be recessed into the ceiling so that only the light transmitting plate and trim are visible.

The lamp box 20 made of sheet metal is received into the usual plaster flange 20a and is of the proper size to accommodate the parts. It has a narrow external flange 21 to engage the ceiling and inner flanges 22 to support the opposite edges of the reflector. A lens frame 23 is held in normal closed position by non-removable nuts 24 threaded on bolts 25 extending down from the sides of the box and when the luminaire is open, the lens frame is suspended from a loop 26. The opening in the lens frame is just slightly smaller than the box, and very narrow trim suffices to support the lens and cover the joint between the ceiling surfacing and the lamp box.

The lamp box carries a diagonal bracket 27 in an upper side corner, and this supports the lamp socket 28 and lamp 29 on an oblique axis. The lamp filament F is centered and at the proper distance above the mouth of the lamp box.

The reflector 30 for use with a concentrated filament source is preferably a prismatic glass reflector to withstand the heat and has a rectangular mouth whose side edges or flanges rest on the box-carried flanges 22. The preferred cut-off angle is 50° above the nadir. The reflector is apertured at 32 to accommodate the lamp 29.

As shown, the reflector 30 is symmetrical about a normally vertical median plane XX. It has upwardly and inwardly converging sides 33, 33 of pyramidal shape and is provided with a dome-like top 34. The sides have vertical totally reflecting prisms 33a. The top has horizontal annular and vertical totally reflecting prisms 34a, 34b, respectively, also inner refracting prisms 34c. The transition from annular to square-shaped may be stepped as indicated in Figure 2 or merging surfaces may be employed.

Light rays from the lamp filament F are reflected downwardly and inwardly as indicated at the left of Figure 1. The paths of rays 35, 36 and 37 falling on the sides of the reflector and of reflected rays 35′, 36′ and 37′ in the plane 1—1 of Figure 2 are shown in full lines, while typical direct and reflected rays in the diagonal plane are indicated by dotted lines 38, 38′. Similar ray paths 39, 39′ and 40, 40′ are indicated in Figure 1a. Similar actions take place in all azimuths with the result that the dominant reflected light proceeds downwardly as though coming from virtual sources in an annular region above the reflector. This light is at relatively low angles from the nadir. The direct light above the source is reflected close to the filament as indicated at 41, 41′.

The reflected light, as well as the direct light, which escapes below the reflector, is refractively transmitted downwardly through a lens plate or refractor 50, the details of which will be discussed below. The reflected rays 35' to 40', inclusive, are beyond the normals to the refractor surface and are deviated as indicated at 35'' to 40'', inclusive, so as to be emitted at higher angles from the nadir. The angles of incidence of reflected light on the upper surface of the refractor 50 are, especially at the margins and corners of the refractor, less than with a flat refractor, so that more efficient shallow prisms on the lower surface are effective in obtaining the deviation desired. The direct rays, such as full line rays 51, 52, 53 and 54 (in place 1—1) and dotted line rays 55, 56 and 57 (in the diagonal plane) are emitted less divergently as indicated by rays 51'' to 57''. The reffected rays emitted from any point on the surface have approximately the same vertical angles as the direct light refractively transmitted, so that the dominant light control is approximately that of Rolph Patent No. 2,101,199, dated December 7, 1937.

In the present construction, the reflected light has relatively low angles of incidence on both surfaces and these rays are raised slightly. For the direct light, however, the angles of incidence on both surfaces are greater and the direct rays are lowered to a greater extent. Owing to the steepness of the marginal portions of the plate, the angles of incidence for the higher rays approach 90° so that the portion of light reflected at the incident surfaces becomes very high and the portion of light accepted correspondingly reduced. As less light is accepted at these high angles of incidence, less light is transmitted and lower brightness brought about. Most of the deviation takes place at the upper surfaces. The shallow prisms make it possible to reduce interception and loses of intermediate surfaces.

The present invention relates to improvements over the showings of the Rolph patent mentioned, whereby the brightness characteristics and appearance of the luminaire, whether lighted or not, and the efficiency of the luminaire are greatly improved. While the refractor of that patent is flat, and flat refracting plates are commonly used, the square lens plate or refractor 50, as shown in Figures 1 to 9, inclusive, is of upwardly convex or dome section and all four side edges of the refractor are in a common plane. When one views a plate of such profile at angles far from the nadir, the nearer edge of the plate eclipses the nearer portion of the plate so that the area observed is much less than that of a flat plate of the same size. This is indicated by the sight lines 58, Figure 1. The screening angle 59 for the center of the lens is approximately 15°.

In order that the under surface of the plate—the side toward the observer should be continuously concave in all directions, the profiles of the plate vary from the center of the sides to the corners and at the same time horizontal curvatures are secured throughout the lens areas. This avoids mitres.

To generate a refractor form for this purpose, one first selects the profile at the center and parallel with the sides. A suitable profile for the lower surface is indicated at 60, Figure 7. While it may be flat at the center, it is preferably slightly convex upwardly. The sides are steeper as is apparent from the drawing. In order that the entire plate receive direct light from the source, the steepness is limited to an amount such that direct light can be transmitted. The extreme direct rays are indicated in 54 and 57, Figure 1a. The shape of the lower or light emergent surface of the glass plate is determined by the plunger used in the molding apparatus. To produce the proper profile on the plunger in all azimuths, it is first given the selected profile in the four principal directions. The central portion, out to the circle 62, is a surface of revolution about the axis 61, as indicated by radius 62' and by iso-elevational line 62'', Figure 7.

Outside the circle 62 and below the line 62' are shown a series of closed figures or loops 63, 64, 65 and 66 and iso-elevational lines 63'', 64'', 65'', 66''. Each of these loops is made up of four short radius arcs 63a to 66a, inclusive, and four long radius arcs 63b to 66b, inclusive. The points of contingency of these arcs are along the dotted lines 67. The outermost loop approaches the square shape.

The lower surface of refractor 50 has concentric refracting prisms generally numbered 70. These prisms, however, are not of uniform refracting power and elevation above the refractor flange in all azimuths, except where the refractor form is surface of revolution. The prisms in this central region are thus indicated in Figures 4 and 5 inside prism 70a.

The prism profile from center 61 to the side edges of the plate is represented by the regressed line 71, Figure 5, while that from the center to the corner is represented by similar line 72. Prism outlines of like radii are one above the other in this figure. The profiles of the opposed incident surfaces are shown by dotted lines 73 and 74, Figure 5. At the increased radius, the incident surface opposite a prism of particular radius varies from a minimum toward the corners of the plate to a maximum toward the side edges. To compensate for this, the faces of the emergent prisms beyond about prism 70a vary according to the angular distance from the radius to the center of the sides of the refractor. Heavy dash lines 75 and 76 in Figure 4 show where the prism slope changes as one passes about the faces of the circular prisms. Between the line 75, 75 at the corners, the profile is that shown at 72, while between the line 76 in one quadrant and a similar line 76 in an adjacent quadrant, the profile is that of 71. The prisms in profile 71 are deeper than those in profile 72. At the orientation of profile 71, a prism such as 70b is located considerably lower vertically and is of greater width w than is the same prism at the orientation of profile 72, where it is higher and of narrower width w'. Between the lines 75 and 76 the slope is intermediate the other slopes.

Figure 8 shows the regressed prisms 70 at a large scale. The surfaces 73 and 77 are at the proper angle to achieve the desired deviation of the direct light. The riser or so-called inactive surface is at 78 and in practice, the surfaces 77 and 78 are always connected by the rounded surfaces 79, 79'. In this present optical design the active surface is extended back of the limited refracted ray 80 in the glass refracting medium so that there is a small part of the prism at the corner which is eclipsed by the root of the next prism. This eclipsed region is indicated by the dotted area in Figure 8. None of the dominant rays fall in this region so that light scattering by the rounded area 79 causing high angle brightness is avoided.

The arrangement of Figure 8 contrasts very favorably with constructions usually employed where the slope of the riser is parallel with the ray in the glass. As shown in Figure 8a, such rays as 82, fall on the corresponding rounded surface and are scattered as indicated at 83 to produce high angled light. This light leakage is always stronger on the near side of the plate toward the observer than on the far side, so that it tends to build up brightness.

Owing to the curvature of the lower surface of the lens in all directions, the concentric lens prisms appearing as circles in Figure 4 become distorted when viewed obliquely. The rise and fall of the prisms relative to the flange of the lens is illustrated in Figures 9 and 9a.

The above discussion has assumed that the upper surface of the refracting plate is smooth. For incandescent sources, it is desirable to provide the lens plate with diffusion means which scatters the light circumferentially, so that the plate presents a better lighted appearance and the reflector and lamp are obscured from direct observation.

The present construction provides an improved diffusion means for this purpose. Lateral deviation for diffusion purposes is typically obtained by radial flutes. As the width of the true radial flutes narrows towards center, such flutes do not provide the most efficient diffusion.

The new flute layout is illustrated herein in Figures 2, 3, 3a and 3b. The square upper surface of the refractor is divided into subordinate rectangular areas by narrow smooth strips which cross at the center and are parallel with the edges of the plate. These strips are indicated at 90. The small square disconnected or discrete blocks of areas 91 between these strips are provided with diffusing flutes. In each square area, one of the flutes marked r is radial, and all of the others are parallel with this flute. The flutes are preferably convex and of identical cross-section, and contiguous. To produce them the mold surface is cut away by a cutter of appropriate contour which traverses the desired area of the mold for each flute. If desired, the ones near the center of the plate may have greater diffusing power than those near the edges of the plate.

As the groups of flutes in areas 91 occupy varying azimuth angles depending upon their location over the surface of the plates, the extreme flutes in the respective areas do not all have the same inclination to the radial plane through the same. For example, the radial plane 92a makes, with the direction of the flute 92b, an angle such as 92c, and the radial planes 93a and 94a make smaller angles 93c and 94c, respectively, with the direction of the flutes 93b and 94b. Thus, over each area there is a symmetric diffusion from the radial flute r and asymmetric diffusion of increasing amount and opposite sign each side of the radial flute. It is greater near the center of the plate where there is a tendency to produce a hot spot owing to the closeness of the light source. This arrangement serves to effect an all-over circumferential diffusion which provides even brightness and a smooth lighting pattern. The flutes will be visible through the refractor.

The adoption of the improved construction above set forth has made it possible to substantially increase the output of light from such lighting fixtures and improve their appearance whether lighted or not. For example, a square 300 watt fixture, made with reflector and flat refractor shown in Rolph Patent 2,101,199, December 7, 1937, with the diffusion pattern of Rolph Patent 2,099,034, dated November 16, 1937, has a 0°–45° output of about 40.8%, and a 0°–60° output of about 50.1%, while a square fixture with the same input and adapted to fit in the same plaster flange as the former square fixture, but having the reflector and refractor shown herein, has at corresponding angles outputs of about 56.4% and 61.6%, respectively. Percentagewise, the improvement is about 38% in the more significant 0–45° zone and 23% in the 0°–60° zone. Also a large part of the nearer portions of the concave lens surface is screened against observation at wide angles from the nadir. For example, at 15° below the horizontal there is only about one-third as much projected area on the near side as with a flat lens of the same size, and this is lateral of the center line. As much of the high angled scattered light from a lens comes inherently from the near side, the reduction in projected area substantially reduces brightness at high angles from the nadir.

It will be understood that one can utilize the concave lens plate profile in a round construction with a round reflector, in which case the full line showing or the dotted line showing of Figure 1 may be sections on surfaces of revolution. The upper surface of such round plate may have a similar diffusion pattern and in the lower surface the prisms are annular and horizontal instead of having a rising and lowering contour. The diffusion pattern on the top of the lens plate may be radially employed on a flat plate. The grooves are easily cut on the flat surface of the mold, or plunger.

The concave lens is also suitable for use with any fluorescent light sources. For such fixtures, the reflectors would be inverted troughs of suitable profile above the sources to handle the light from such sources and the refracting plates would have a profile similar to that of Figure 1 with suitable rectilinear prisms, except for the refracting prisms at the ends. These end plates shown at 100 in Figure 10, would have some rectilinear prisms 101 and at the end would have the same contour as one-half of the plate 50, and generally indicated at prisms 102. The upper surface for the fluorescent luminaire plate may be smooth.

Figure 11 shows a lens similar to the lens above described, except that at a distance from the center, the prisms instead of being concentric over the entire surface of the lens are closed loops with parallel portions 111, parallel with the sides of the plate and connecting arcs 112. If such an arrangement of prisms were cut on a refractor form such as in Figures 6 and 7, the arcs 112 would well be about the same centers as arcs 63a etc., and the parallel portions would be arched. For such an arrangement of straight and curved loop prisms it would be easier to prepare the refractor form with surfaces of simple curvature between diverging lines 67, 67 of Figure 7. The over-all output and light pattern of the luminaire with non-concentric prisms would be almost identical as would be the shielding action, but the appearance would be altered.

What is claimed is:

1. A direct lighting luminaire comprising a light source, an open mouthed specular reflector about the light source with its vertical axis of symmetry through the source and having its mouth substantially 40° below the horizontal through the source and a profile to converge reflected light toward the axis at relatively steep angles, a prismatic plate across the mouth of the reflector to intercept direct and reflected light and having regressed, light-deviating prisms on the lower surface to deviate the light with respect to said vertical axis, the margins of the prismatic plate being close to the margins of the reflector and having an upper face generally convex in transverse planes and of a steepness to be substantially in line with the source so that the angles of incidence of the most divergent direct rays approach 90° with consequent reduced acceptance and transmission and the reflected rays falling thereon are adjacent the normals to the surface, and on the side toward the vertical axis, the lower surfaces of the prisms in transverse planes being at outwardly acute angles with respect to the opposed upper surfaces, whereby divergent direct light is transmitted with reduced divergence and the convergent reflected light is transmitted with greater convergence, but with less deviation in passing through the plate than the direct light.

2. The direct lighting luminaire of claim 1, wherein the source is a substantially point source, and the reflector and prismatic plate accept light in all azimuths and redirect the light radially.

3. The direct lighting luminaire of claim 1, wherein the source is a susbtantially point source, and the reflector and prismatic plate accept light in all azimuths and redirect the light radially, and wherein the upper surface of the prismatic plate has a light diffusion pattern acting to spread the light circumferentially and formed of discrete areas of parallel flutes, one flute in each area being radial.

4. The direct lighting luminaire of claim 1, wherein the source is a substantially point source, and the reflector and prismatic plate accept light in all azimuths and redirect the light radially, and wherein the risers intermediate the active faces of the regressed prisms are steeper than the limiting ray in the plate so that the lower or outside corner of the prism is eclipsed by the upper or inside corner of the prism.

5. The direct lighting luminaire of claim 1, wherein the source is a substantially point source, the reflector is square with a square mouth and redirects the reflected light radially inward, the refracting plate is square and of less marginal steepness radially at the corners than at the center of the sides, and the prisms are disposed about the center to redirect the direct and reflected rays radially.

6. A direct lighting luminaire such as claimed in claim 5, wherein the retracting power of the prisms is greater at the corners of the plate than at the centers of the sides whereby the higher angle direct light falling on the corners is deviated more than that received between the corners.

7. A direct lighting luminaire such as claimed in claim 1, wherein the margins of the refracting plate are substantially 15° below the horizontal through the center of the prismatic plate so as to eclipse the central near side of the plate at angles of observation about 75° above the nadir and substantially reduce the visible projected area of the near side visible in regions beyond the highest direct and reflected rays emitted by the plate.

8. A direct lighting luminaire comprising a light source, a reflector symmetrical about a vertical plane through the source and of a contour above substantially 40° below the horizontal to reflect rays downwardly and convergently toward said plane, and a refracting plate having on the lower surface and on opposite sides of said plane refracting prisms which increase the convergence of the emitted reflected light and also decrease the divergence of the emitted direct light, the plate being downwardly concave with its center substantially horizontal and its margins steeply curved in an amount to make the marginal reflected light approximately normal to thereby effect high utilization of the reflected light falling thereon, and to have high angles of incidence of nearly 90° for direct light to reduce acceptance thereof and transmission thereby and to screen the near side of the plate against observation at high angles from the nadir.

9. A direct light luminaire such as claimed in claim 8, wherein the source is substantially a point source, the prisms on the refracting plate are disposed about a vertical axis through the source and the upper surface of the plate is provided with discrete areas made up of parallel flutes all of equal refracting power, one flute in each area being radial so that the others are oblique to the radius whereby diffusion in regions near the center of the plate is greater than in the outer regions to thereby reduce the brightness of the center of the plate near the source.

[10. A refractor form of polygonal shape and having opposed coplanar marginal edge portions and its opposite surfaces between the edge portions continuously concave toward the plane of the edge portions, the intersections of said surfaces with planes parallel with said edge plane and approaching them being circles of increasing radius about a center surrounded by closed figures composed of circular arcs, the arcs between the center and the corners of the polygon having lessening radii toward the corners, the arcs between the center and the sides of the polygon having increasing radii so that the successive closed figures approach the polygonal outline.]

11. In combination, a substantially point light source, a substantially square light refracting and transmitting plate intercepting direct light rays in a region with the source as its apex, the plate having an upwardly convex light incident surface substantially flat centrally and of steepness at the margins to be substantially coincident with the outermost rays in the said region, whereby the incident light is refractively transmitted wih the maximum deviation into the plate, the lower surface of the plate having light condensing prisms which reduce the divergence of the direct light, the central prisms having uniform refracting power in all azimuths, the outer prisms in the corner portions of the plate having more refracting power than prisms at corresponding radii toward the side edges of the plate.

12. A light transmitting and diffusing refractor having on one face a series of light converging prisms disposed about a center and on the other face discrete diffusing areas separated by smooth areas and wherein the diffusing areas are each made up of a series of parallel diffusing flutes, one medially disposed flute in each area being radial so that the diffusion, while generally transverse of the bending of the rays by the prisms, varies in direction over each diffusing area.

13. A light transmitting and diffusing refractor having on one face a series of light converging prisms disposed about a center and on the other face a series of narrow smooth areas at right angles to one another and separate rectangular areas each made up of narrow flutes parallel with one another on each such area, one medially disposed flute in each area being radial so that the diffuser, while generally transverse of the bending of the rays by the prisms varies in direction over each diffuser area, all the diffusing flutes being of like refracting power so that there is greater variation in direction of diffusion in the fluted areas near said center than in the more remote areas.

14. A light transmitter and diffuser made of transparent material and having a relatively large, continuous light receiving area made up of relatively narrow smooth areas and relatively large diffusion areas separated from one another by the smooth areas, and wherein the separate diffusion areas are each made up of relatively narrow flutes parallel with one another on such diffusion area and in generally radial directions from a point located centrally of the light receiving area so that the light is diffused in tangential directions.

15. A light transmitter and diffuser such as claimed in claim 14 wherein the smooth areas are straight strips at right angles to one another and the diffusion areas are rectangular.

16. A light transmitter and diffuser such as claimed in claim 14, wherein one flute in each fluted area is in a plane radial with respect to an axis normal to the entire light receiving area so that light is diffused by the flutes in each area in variant directions with respect to the radial plane of the radial flute thereof.

17. A light transmitter and diffuser such as claimed in claim 14, wherein the flutes in each area are adjacent one another.

18. A light transmitter and diffuser such as claimed in claim 14, wherein all the flutes in all the areas are of like refracting power.

19. A direct lighting luminaire comprising a light source, a reflector symmetrical about a vertical median plane through the source extending below the source and of a profile to reflect light downwardly toward said median plane and a refracting plate having on its lower face concentric prisms which increase the convergence of the reflected rays and reduce the divergence of the direct rays falling on the plate, the plate also having relatively steep upwardly converging marginal portions under the marginal portions of the reflector with angles of incidence for direct light approaching 90° whereby the direct light accepted by the marginal portions is reduced, the plate also being relatively flat inside the steep portions so that at high angles of observation below the horizontal normal to said median plane the near side edge of the plate screens the nearer areas of the plate from which the small portion of the highest angled direct light accepted is being emitted.

*20. A refractor comprising a substantially square light refracting and transmitting plate having an upwardly convex light incident surface which is substantially flat centrally and of appreciable steepness between the central portion and the edges of the plate, said plate having a lower light emitting surface which is generally concave, said lower surface having regressed condensing prisms, the prisms being in the form of circles of increasing radius about the center of the plate and circular arcs between the center and the corners of the plate, the upper surface being a light diffusing surface made up of relatively*

*narrow smooth areas and relatively large diffusion areas separated from one another by the smooth areas, and wherein the separate diffusion areas are each made up of relatively narrow flutes parallel with one another on such diffusion area and in generally radial directions from the center of the plate so that the light is diffused in tangential directions.*

*21. A refractor comprising a prismatic plate of square shape and having opposed coplanar marginal edges, said plate having an upper light incident generally convex surface between the edge portions and a lower generally concave surface between the edge portions, the marginal edges of the refracting plate being substantially 15° below the horizontal through the center of the prismatic plate so as to eclipse the central near side of the plate at angles of observation about 75° above the nadir, said plate having on its concave surface regressed light condensing prisms with relatively narrow risers and relatively wide active surfaces, said prisms being in the form of circles of increasing radius about the center of the plate and circular arcs between the center and the corners of the square.*

*22. A direct lighting luminaire comprising a light source, an open mouthed specular reflector about the light source having a vertical axis of symmetry through the source and having its mouth substantially 40° below the horizontal through the source and a profile to converge reflected light toward the axis at relatively steep angles, a prismatic plate across the mouth of the reflector to intercept direct and reflected light, the margins of the prismatic plate being close to the margins of the reflector, said plate being of rectangular shape and having opposed coplanar marginal edge portions, said plate having an upper generally convex light incident surface constituting the entire upper surface between the edge portions and a lower generally concave surface constituting the entire lower surface between the edge portions, said plate having on its concave surface regressed light converging prisms with relatively narrow risers and relatively wide active surfaces, said prisms being in the form of closed figures including circular arcs concave toward the center of the plate and extending symmetrically about lines bisecting the corners of the plate and straight lines parallel to the edges of the plate joining the ends of the arcs.*

*23. A refractor comprising a prismatic plate of polygonal shape and having opposed coplanar marginal edge portions, said plate having an upper light incident generally convex surface between the edge portions and a lower generally concave surface between the edge portions, said plate having on its concave surface regressed light condensing prisms with relatively narrow risers and relatively wide active surfaces, said prisms being in the form of circles of increasing radius about a center and surrounded by closed figures, said closed figures including circular arcs between the center and the corners of the polygon, the portions of the outer closed figures between the center and the sides of the polygon being substantially parallel to the sides of the polygon.*

*24. A refractor comprising a prismatic plate of polygonal shape and having opposed coplanar marginal edge portions, said plate having an upper generally convex light incident surface between the edge portions and a lower generally concave surface between the edge portions, said plate having on its concave surface regressed light converging prisms with relatively narrow risers and relatively wide active surfaces, said prism being in the form of circles of increasing radius about a center and surrounded by closed figures, said closed figures including circular arcs between the center and the corners of the polygon, said arcs having lessening radii towards the corners, the portions of the outer closed figures between the center and the sides of the polygon being substantially parallel to the sides of the polygon.*

*25. A refractor comprising a prismatic plate of polygonal shape and having opposed coplanar marginal edge portions, said plate having an upper light incident generally convex surface between the edge portions and a lower generally concave surface between the edge portions, said plate having on its concave surface regressed light condensing prisms with relatively narrow risers and relatively wide active surfaces, said prisms being in the form of circles of increasing radius about a center and surrounded by closed figures, said closed figures including circular arcs between the center and the corners of the polygon, said arcs having lessening radii toward the corners, the portions of the outer closed figures between the center and the sides of the polygon being substantially parallel to the sides of the polygon, said upper surface being a light diffusing surface.*

*26. A refractor comprising a substantially square light refracting and transmitting plate having an upwardly convex light incident surface which is substantially flat centrally and inclined between the central portion and the edges of the plate, said plate having a lower light emitting surface which is generally concave, said lower surface having regressed condensing prisms, some of said prisms being in the form of circles of increasing radius about the center of the plate, the remainder of said prisms being in the form of closed figures surrounding the circles, the closed figures including circular arcs between the center and the corners of the plate, said arcs having lessening radii toward the corners the portions of the outer closed figures between the center and the sides of the plate being substantially parallel to the sides of the plate.*

*27. A refractor comprising a substantially square light refracting and transmitting plate having an upwardly convex light incident surface which is substantially flat centrally and inclined between the central portion and the edges of the plate, said plate having a lower light emitting surface which is generally concave, said lower surface having regressed condensing prisms, the prisms being in the form of circles of increasing radius about the center of the plate and closed figures surrounding the circles, the closed figures including circular arcs between the center and the corners of the plate, said arcs having lessening radii toward the corners, the portions of the outer closed figures between the center and the sides of the plate being substantially straight lines, said upper surface being a light diffusing surface.*

*28. A refractor comprising a prismatic plate having a marginal edge portion lying in a single plane, said plate having an upper light incident generally convex surface and a lower generally concave surface, said plate having on its concave surface regressed light condensing prisms with relatively narrow risers and relatively wide active surfaces, a plurality of said prisms being in the form of circles of increasing radius about a center, said upper surface being a light diffusing surface the risers intermediate the active faces of the regressed prisms being steeper than the limiting ray in the plate so that the lower or outside corner of a prism is eclipsed by the upper or inside corner of the prism.*

*29. A direct lighting luminaire comprising a light source, an open mouthed specular reflector about the light source having a vertical axis of symmetry through the source and having its mouth substantially 40° below the horizontal through the source and a profile to converge reflected light toward the axis at relatively steep angles, a prismatic plate across the mouth of the reflector to intercept direct and reflected light, the margins of the prismatic plate being close to the margins of the reflector, said plate having a marginal edge portion lying in a single plane, said plate having an upper light incident generally convex surface and a lower generally concave surface, said plate having on its concave surface regressed light condensing prisms with relatively narrow risers and relatively wide active surfaces, a plurality of said prisms being in the form of circles of increasing radius about a center, said upper surface being a light diffusing surface, the risers intermediate the active faces*

*of the regressed prisms being steeper than the limiting ray in the plate so that the lower or outside corner of a prism is eclipsed by the upper or inside corner of the prism.*

References Cited in the file of this patent or the original patent

UNITED STATES PATENTS

| | | |
|---|---|---|
| 631,996 | Pitkin | Aug. 29, 1899 |
| 1,583,768 | Albrecht | May 11, 1926 |
| 2,022,222 | Sullivan | Nov. 26, 1935 |
| 2,082,100 | Dorey et al. | June 1, 1937 |
| 2,099,034 | Rolph | Nov. 16, 1937 |
| 2,101,199 | Rolph | Dec. 7, 1937 |
| 2,158,653 | Doane | May 16, 1939 |
| 2,192,019 | Schepmoes | Feb. 27, 1940 |
| 2,258,875 | Arras | Oct. 14, 1941 |
| 2,602,135 | Nordquist | July 1, 1952 |

FOREIGN PATENTS

| | | |
|---|---|---|
| 644,109 | Great Britain | Oct. 4, 1950 |